Figure 1:
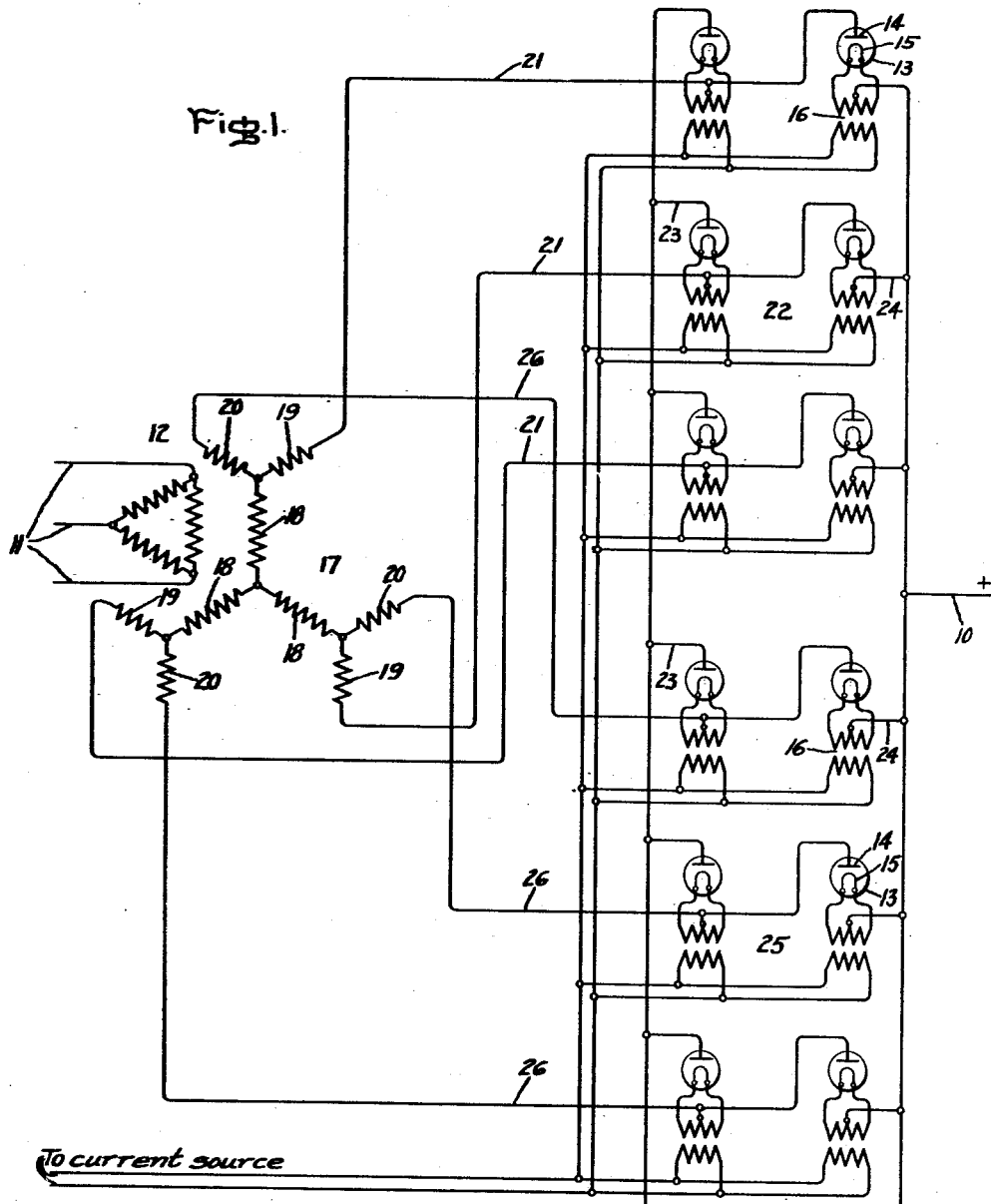

Oct. 24, 1933.  I. J. KAAR  1,932,272
EXTENDED WINDING RECTIFIER
Filed Sept. 25, 1930   2 Sheets-Sheet 2

Inventor:
Ira J. Kaar,
by Charles V. Mullen
His Attorney.

Patented Oct. 24, 1933

1,932,272

UNITED STATES PATENT OFFICE 1,932,272

EXTENDED WINDING RECTIFIER

Ira J. Kaar, Schenectady, N. Y., assignor to General Electric Company, a corporation of New York Application September 25, 1930
Serial No. 484,400

6 Claims. (Cl. 175—363)

My invention relates to systems for rectifying alternating current, particularly to rectifier systems for use with radio transmitters, and has for its principal object the provision of an improved rectifier system for such uses and adapted to operation on alternating current power supply of a low frequency, such as twenty-five cycles.

Various rectifier systems have been provided in the past for supplying direct current to the anode circuits of amplifier and other tubes of radio transmitters. In such installations it is essential that the ripple in the output current of the rectifier apparatus be reduced to a certain value in order to avoid undesirable effects in the operation of the transmitter tubes. One of the rectifier systems heretofore employed with radio transmitters and similar apparatus comprises a rectifier unit arranged for full-wave rectification and supplied from the usual 3-phase alternating current circuit through a transformer having a 3-phase Y-connected secondary, the secondary phases being connected respectively to the pairs of rectifiers comprised in the full-wave rectifier unit. This system provides 6-phase rectification, since both an anode and a cathode of the rectifier unit are connected to each of the three secondary phases and, therefore, three voltages are applied to the rectifier unit due to current impulses in one direction in the secondary phases, and three other voltages are also applied to the rectifier unit due to current impulses in the secondary phases in the reverse direction.

The resulting 6-phase ripple in the output current of the above described rectifier unit does not create serious disturbance when the power supply is at sixty cycles since the size and cost of the filter system required to reduce the ripple to the desired degree are not then prohibitive. But difficulties have been encountered in the use of this 6-phase rectifier system where the power supply is at twenty-five cycles, since, in the latter case, in order to reduce the ripple in the output current to a permissible value it is necessary to provide a filter system for the rectified current so extensive and of such a character that the cost of the filter system becomes an appreciable part of the total cost of the rectifier system.

In accordance with my invention, this difficulty is overcome by the provision of a rectifier system which operates from an alternating current supply of course, preferably 3-phase, at a low frequency, for example twenty-five cycles, but which does not require an expensive filter for the output current when used for the supply of direct current to the anode circuits of radio transmitters or for analogous purposes. This result is accomplished by the employment of a transformer and rectifier arrangement giving a 12-phase alternating current supply. In the transformer arrangement comprised in this system two sets of secondary phases each comprising three phases are provided and the phases of each of these sets of phases are connected respectively to pairs of rectifiers arranged in two rectifier units for full-wave rectification. The end points of the three secondary phases connected to the pairs of rectifiers of one of the rectifier units are displaced thirty degrees respectively from the corresponding end points of the three secondary phases connected to the pairs of rectifiers of the other rectifier unit. 12-phase rectification is thus effected, since six voltages due to current impulses in one direction in the secondary phases and six voltages due to current impulses in the reverse direction are applied to the rectifiers.

The transformer arrangement incorporated in the above described 12-phase rectification system may comprise a single secondary having three main windings and three pairs of stub windings, the windings being so disposed, on the usual 3-phase core, for example, that the corresponding phases of the two sets of phases are displaced thirty degrees from each other.

In a further arrangement of the rectifier system in accordance with my invention, two separate 3-phase transformer secondaries are employed which may be wound on a common 3-phase core or may be incorporated in two separate transformers. In this arrangement of the rectifier system the windings of the two secondaries are so disposed that the three phases of one of the secondaries are displaced respectively thirty degrees from the corresponding three phases of the other secondary. The resulting two sets of phases are connected respectively, as above described in connection with the single secondary arrangement, to pairs of rectifiers arranged in two rectifier units, but the units in the two-secondary system are connected to the output or direct current circuit through an interphase reactor. This latter described system, comprising the two separate transformer secondaries and the interphase reactor connecting the two full-wave rectifier units, offers the advantage over the system comprising the single transformer that the current pulsations from the two rectifier halves are overlapped thus reducing the peak current which any single tube must carry.

The above described 12-phase rectifier systems in accordance with my invention have been found to reduce the ripple in the rectifier output circuit to such an extent that, if the systems are used to supply current to the anode circuits of a radio telegraph transmitter, only an inexpensive filter is required even when the power supply is at twenty-five cycles, or if used with a sixty-cycle power supply the filter may be dispensed with entirely except for a small, harmonic-limiting reactor.

My invention will be better understood from the following description when considered in connection with the accompanying drawings and its scope will be pointed out in the appended claims.

Figure 2:
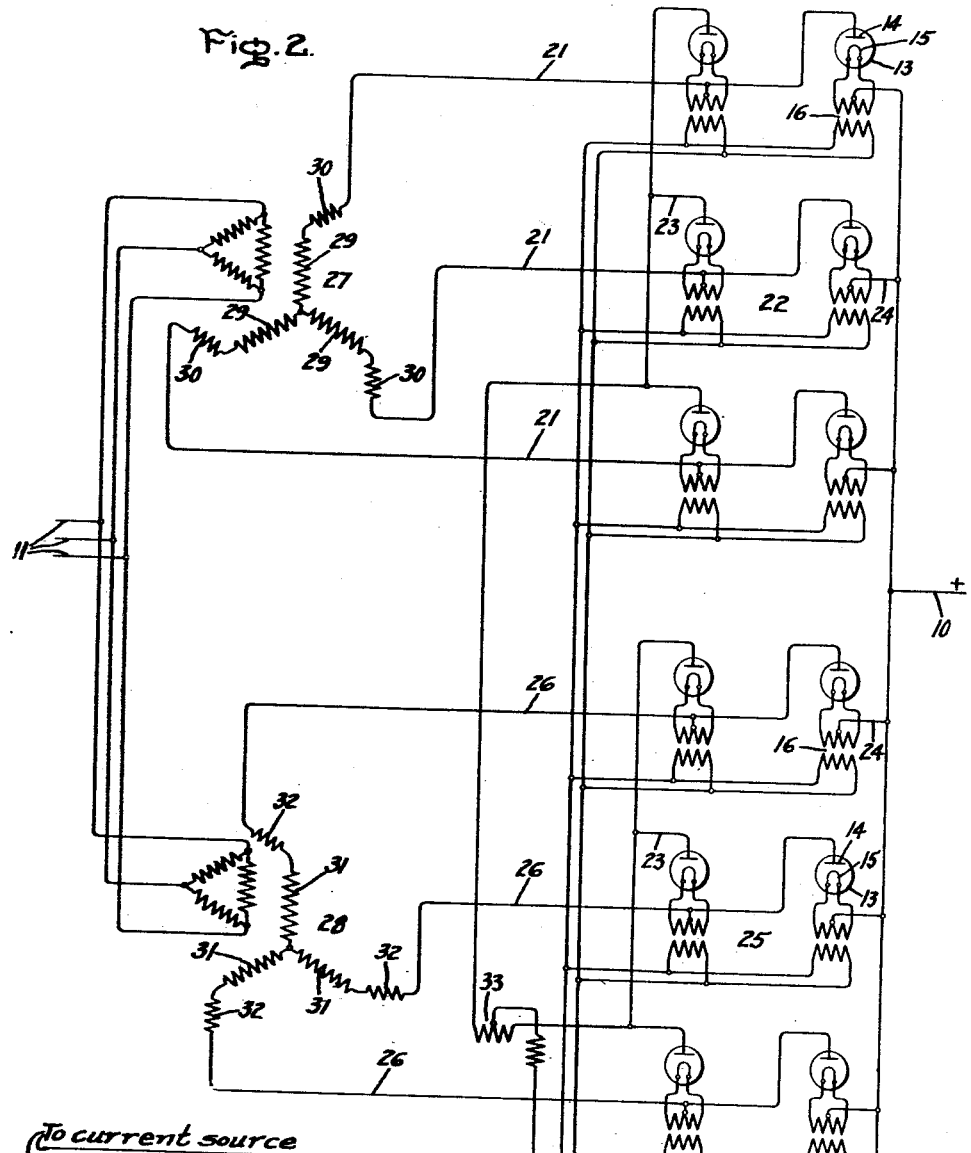
Figure 4:
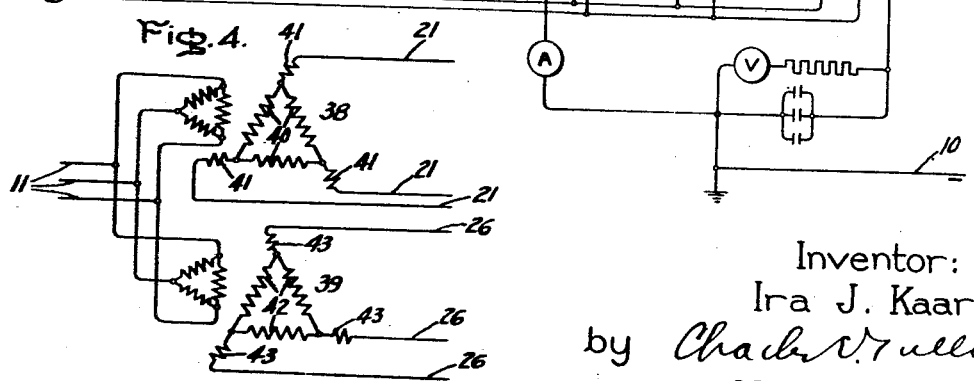

Referring to the drawings, Figs. 1 and 2 illustrate diagrammatically rectifier systems in which different modifications of my invention have been embodied, and Figs. 3 and 4 illustrate modifications of the transformer secondary connections.

In the system shown in Fig. 1, rectified current is supplied to a direct current circuit 10 from a 3-phase alternating current circuit 11 through a transformer 12 and twelve rectifiers 13 arranged in pairs for full-wave rectification. The rectifiers are preferably of the hot-cathode type comprising anodes 14 and cathodes 15, which may be supplied with heating current from an alternating current source through transformers 16.

In accordance with my invention the secondary 17 of transformer 12 comprises three star-connected main windings 18, each having two stub windings 19, 20 connected thereto, the windings being so arranged that the phase of the "zigzag" windings formed by main windings 18 and stub windings 19 is displaced thirty degrees from that of the "zigzag" windings formed by main windings 18 and stub windings 20. Two sets of phases having three phases each, "zigzag" connected, are thus formed having windings 18 common to both sets of phases. Each phase 18, 19 of one of these sets of phases is connected by leads 21 to an anode and cathode of a different one of three pairs of rectifiers forming a rectifier unit 22. The three remaining anodes of this rectifier unit are connected to the negative side of the direct current circuit 10 by leads 23 and the three remaining cathodes of the unit 22 are connected to the positive side of this circuit by leads 24.

It will be observed that the rectifier unit 22, comprising three pairs of rectifiers supplied from the secondary 17, provides 6-phase rectification of current from the 3-phase alternating current circuit 11, since each of the three phases formed by the zigzag windings 18, 19 is connected both to an anode and a cathode of the rectifier unit 22. If this unit 22, constituted by six rectifiers arranged in pairs for full-wave rectification, were to be used alone for the supply of rectifying current, the resulting 6-phase ripple in the output circuit 10 would cause difficulty, as hereinbefore explained, assuming the power supply in circuit 11 to be at twenty-five cycles. The system shown in Fig. 1 overcomes this difficulty by providing a second rectifier unit 25 similar in all respects to the above described unit 22 and supplied with current from the same transformer 17 which supplies unit 22 through phase windings 18, 19 but having respective end points displaced by thirty degrees. Each phase 18, 20 of the other of the two sets of phases of transformer secondary 17 is connected by leads 26 to an anode and a cathode of a different one of the three pairs of rectifiers forming this second rectifier unit 25. The remaining anodes of this unit are connected through leads 23 to the negative side of circuit 10 and the remaining cathodes are connected to the positive side of this circuit through leads 24. The rectifier unit 25, thus connected, provides 6-phase rectification in the same manner as described above in connection with rectifier unit 22. Since, however, the six phases provided by rectifier unit 25 through the three "zigzag" windings 18, 20 are displaced respectively thirty degrees from the corresponding six phases provided by rectifier unit 22 through the three "zigzag" windings 18, 19, therefore 12-phase rectification is effected by the combination of the two rectifier units and only 12-phase ripple is impressed on the direct current circuit 10 to which both rectifier units are connected.

In the system shown in Fig. 2, twelve rectifiers 13 are arranged in pairs for full-wave rectification, three pairs of the rectifiers forming a rectifier unit 22 and the other three pairs forming a second similar unit 25, in the same manner as in the system shown in Fig. 1. The system of Fig. 2 differs from that of Fig. 1 however in that the rectifier units 22 and 25 are not supplied from a single transformer secondary 17 but from separate transformer secondaries 27 and 28 including, respectively, main windings 29 and 31 and stub windings 30 and 32. These windings form two sets of phases having three phases each, "zigzag" connected, and are so disposed that the two sets of phases are displaced thirty degrees from each other. Each phase 29, 30 of the set of phases provided by secondary 27 is connected to an anode and cathode of a different one of the three pairs of rectifiers forming rectifier unit 22, and each phase 31, 32 of secondary 28 is connected to an anode and cathode of a different one of the three pairs of rectifiers forming unit 25. The secondaries 27 and 28 may be wound on a common three phase core or, as shown in Fig. 2, may be incorporated in two separate transformers. The rectifier cathodes 15 not connected to the transformer windings are connected to the positive side of the direct current circuit 10 by leads 24, as in the system shown in Fig. 1, but the groups of three anodes each in rectifier units 22 and 25 respectively which are not connected to the transformer windings are connected to the direct current circuit 10 through an interphase reactor 33.

The operation of the system shown in Fig. 2 is in general similar to that of the system shown in Fig. 1 but differs therefrom in that the interconnection of the common anode terminals of the two full-wave rectifier units through the interphase reactor 33 secures the advantage of 12-phase output current with overlapped current pulsations resulting in the aforementioned advantages.

In the systems shown in Figs. 1 and 2 the transformer secondaries 17, 27 and 28 are star-connected. It is to be understood, however, that the secondaries may be delta-connected, as shown in Figs. 3 and 4. In Fig. 3 the secondary 34 comprises the main windings 35 and the stub windings 36, 37 so arranged that the leads 21 and 26 are connected respectively to phases displaced thirty degrees from each other, as in the system shown in Fig. 1 in which the secondary 17 is star-connected. In Fig. 4, the secondaries 38 and 39 comprise respectively main and stub windings 40, 41 and main and stub windings 42, 43 so arranged that the leads 21 and 26 are connected respectively to phases displaced thirty degrees from each other, as in the system shown in Fig. 2 wherein the secondaries 27 and 28 are star-connected.

The systems above described comprise twelve rectifiers arranged in pairs for full-wave rectification from a 3-phase alternating current supply. It will be obvious, however, that each of the twelve individual rectifiers may be replaced by a plurality of rectifiers in parallel.

It is to be observed that the invention is not limited to the 3-phase transformer and 12-phase rectifier arrangements described but contemplates in general a rectifying system comprising transformer means supplied from an $n$ phase alternating current source, and $4n$ rectifiers arranged in pairs for full-wave rectification, the transformer arrangement providing two sets of $n$ phases, the two sets being displaced from each other by $\frac{360}{4n}$ degrees.

What I claim as new and desire to secure by Letters Patent of the United States, is:

1. The combination of a direct current circuit, a three-phase alternating current circuit, two rectifier units, each of said rectifier units comprising six rectifiers arranged in pairs for full-wave rectification, current transforming means to supply current from said alternating current circuit to said rectifier units, said current transforming means including two transformer secondaries, each of said transformer secondaries providing three phases, the phases of one of said transformer secondaries being displaced respectively thirty degrees from the corresponding phases of the other of said transformer secondaries, each of the phases of said one of said transformer secondaries being connected to a different one of said pairs of rectifiers of one of said rectifier units, each of the phases of said other of said transformer secondaries being connected to a different one of said pairs of rectifiers of the other of said rectifier units, and means to connect said rectifiers to said direct current circuit, said last-named means including an interphase reactor between said rectifier units.

2. The combination of a direct current circuit, an $n$ phase alternating current circuit, two rectifier units, each of said rectifier units comprising $2n$ rectifiers arranged in pairs for full-wave rectification, current transforming means to supply current from said alternating current circuit to said rectifier units, said current transforming means including two transformer secondaries, each of said transformer secondaries providing $n$ phases, the phases of one of said transformer secondaries being displaced respectively $$\frac{360}{4n}$$

degrees from the corresponding phases of the other of said transformer secondaries, each of the phases of said one of said transformer secondaries being connected to a different one of said pairs of rectifiers of one of said rectifier units, each of the phases of said other of said transformer secondaries being connected to a different one of said pairs of rectifiers of the other of said rectifier units, and means to connect said rectifiers to said direct current circuit, said last-named means including an interphase reactor between said rectifier units.

3. The combination of a direct current circuit, a three phase alternating current circuit, two rectifier units, each of said rectifier units comprising six rectifiers arranged in pairs for full-wave rectification, two transformers, each of said transformers being arranged to supply current from said alternating current circuit to a different one of said rectifier units, each of said transformers including a secondary providing three phases, the phases of one of said secondaries being displaced respectively thirty degrees from the corresponding phases of the other of said secondaries, each of the phases of said one of said secondaries being connected to a different one of said pairs of rectifiers of one of said rectifier units, each of the phases of said other of said secondaries being connected to a different one of said pairs of rectifiers of the other of said rectifier units, and means to connect said rectifiers to said direct current circuit, said means including an interphase reactor connected between said rectifier units.

4. The combination of a direct current circuit, an $n$ phase alternating current circuit, two rectifier units, each of said rectifier units comprising $2n$ rectifiers arranged for full-wave rectification, two transformers, each of said transformers being arranged to supply current from said alternating current circuit to a different one of said rectifier units, each of said transformers including a secondary providing $n$ phases, the phases of one of said secondaries being displaced respectively $$\frac{360}{4n}$$

degrees from the corresponding phases of the other of said secondaries, each of the phases of said one of said secondaries being connected to a different one of said pairs of rectifiers of one of said rectifier units, each of the phases of said other of said secondaries being connected to a different one of said pairs of rectifiers of the other of said rectifier units, and means to connect said rectifiers to said direct current circuit, said means comprising an interphase reactor connected between said rectifier units.

5. The combination of a direct current circuit, a three-phase alternating current circuit, and rectifying means to reduce the ripple in said direct current circuit, said ripple being not less than twelve phase, said means comprising two rectifier units, each of said rectifier units comprising six rectifiers arranged in pairs for full-wave rectification, current transforming means to supply current from said alternating current circuit to said rectifier units, said current transforming means including two transformer secondaries, each of said transformer secondaries providing three phases, the phases of one of said transformer secondaries being displaced respectively thirty degrees from the corresponding phases of the other of said transformer secondaries, each of the phases of said one of said transformer secondaries being connected to a different one of said pairs of rectifiers of one of said rectifier units, each of the phases of said other of said transformer secondaries being connected to a different one of said pairs of rectifiers of the other of said rectifier units, and means to connect said rectifiers to said direct current circuit, said last-named means including an interphase reactor between said rectifier units.

6. The combination of a direct current circuit, a three phase alternating current circuit, and rectifying means to reduce the ripple in said direct current circuit, said ripple being not less than twelve phase, said means comprising two rectifier units, each of said rectifier units comprising six rectifiers arranged in pairs for full-wave rectification, two transformers, each of said transformers being arranged to supply current from said alternating current circuit to a different one of said rectifier units, each of said transformers including a secondary providing three phases, the phases of one of said secondaries being displaced respectively thirty degrees from the corresponding phases of the other of said secondaries, each of the phases of said one of said secondaries being connected to a different one of said pairs of rectifiers of one of said rectifier units, each of the phases of said other of said secondaries being connected to a different one of said pairs of rectifiers of the other of said rectifier units, and means to connect said rectifiers to said direct current circuit, said means including an interphase reactor connected between said rectifier units.

IRA J. KAAR.